United States Patent [19]

Fredriksson

[11] Patent Number: 5,206,081
[45] Date of Patent: Apr. 27, 1993

[54] SOUND ABSORBENT AND HEAT INSULATING FIBER SLAB

[76] Inventor: Sven Fredriksson, Treklovervagen 13, S-459 00 Ljungskile, Sweden

[21] Appl. No.: 603,680
[22] PCT Filed: May 18, 1989
[86] PCT No.: PCT/SE89/00277
    § 371 Date: Nov. 1, 1990
    § 102(e) Date: Nov. 1, 1990
[87] PCT Pub. No.: WO89/11384
    PCT Pub. Date: Nov. 30, 1989

[30] Foreign Application Priority Data

May 19, 1988 [CH] Switzerland .......................... 8801876

[51] Int. Cl.$^5$ .............................................. D04H 1/58
[52] U.S. Cl. ...................................... 428/288; 428/289
[58] Field of Search ................................. 428/245, 288

[56] References Cited

U.S. PATENT DOCUMENTS

| | | | |
|---|---|---|---|
| 4,324,831 | 4/1982 | Parrini et al. | 428/288 |
| 4,417,931 | 1/1983 | Li | 156/62.2 |
| 4,439,477 | 3/1984 | Kiss | 428/102 |
| 4,539,252 | 9/1985 | Franz | 428/218 |
| 4,613,627 | 9/1986 | Sherman et al. | 521/68 |
| 4,647,324 | 3/1987 | Mtangi et al. | 156/62.2 |
| 4,786,670 | 11/1988 | Tracy et al. | 524/34 |
| 5,055,341 | 10/1991 | Yamaji et al. | 428/174 |

Primary Examiner—George F. Lesmes
Assistant Examiner—Chris Raimund
Attorney, Agent, or Firm—Kinzer, Plyer, Dorn, McEachran & Jambor

[57] ABSTRACT

A sound absorbing and heat insulating fiber slab containing cellulose fibers which are bonded together with the aid of an inorganic, flame-proof binder is characterized in that the binder belongs to the group of polymeric silicates which dry at room temperature. The binder is homogeneously distributed in the slab and bonds mutually adjacent fibers in a punctiform fashion, to form a coherent matrix. The slab has a density of from 30 to 70 kg/m$^3$ and the binder is present in an amount of 1–20 percent by weight.

2 Claims, 2 Drawing Sheets

SOUND ABSORBENT AND HEAT INSULATING FIBER SLAB

The present invention relates to an absorbent and heat insulating fiber slab which comprise cellulose fibers bound together by means of an inorganic flameproof binder.

By flame-binder is meant here a binder which can only be ignited with difficulty and which is self-extinguishing.

One important advantage afforded by cellulose-fiber based slabs is that the fibers do not present a health hazard, as opposed to asbestos fibers, mineral wool fibers and glass wool fibers for instance, which must be handled with extreme caution when in a free, unbound state. Distinct from fibers of this last mentioned kind, cellulose fibers are also suited for transportation with the aid of pneumatic devices and are able to pass through transporting fans without being hacked into small pieces.

It is known to impregnate cellulose fibers with, for instance, a solution of water glass and to press the resultant mass into a compact sheet or web.

Such sheets, however, to a large extent lack sound absorbing and heat insulating properties and are unable to fulfill the intended function in, for instance, prefabricated building elements or wall structures, mainly because the originally flexible fibers are so tightly packed together, and so impregnated with binder as to become totally rigid. Consequently, it is a prime object of the present invention to provide a fiber slab or a fiber mat of the kind defined in the introduction in which the individual fibers are, to a large extent, joined to one another by punctiform adhesive bonds, and in which said individual fibers have not been impregnated with binder and retain a high degree of mobility in the formed slab and therewith the ability to convert acoustic energy to thermal energy, and in which the fibers enclose air inclusions therebetween, such as to be heat insulating.

This object is realized to the full with the inventive fiber slab or fibre web defined in the claims, and described hereinafter with reference to the accompanying drawings, in which FIG. 1 illustrates plant machinery for manufacturing the inventive slabs;

Figure 1:
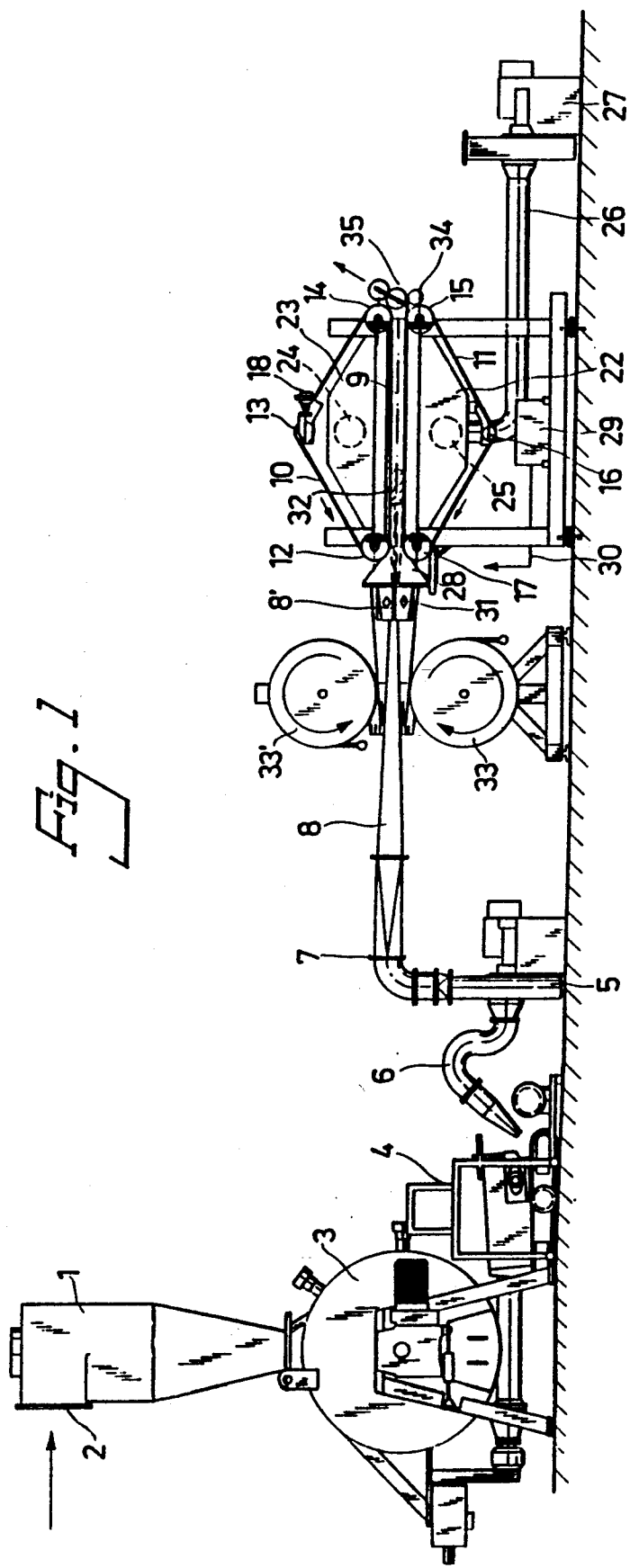

FIG. 1 is a simplified illustration of plant machinery according to the invention. It is assumed in the following description that the inventive slabs are formed from a cellulose-fiber starting material, fluff, this material optionally being formed into continuous lengths which are subsequently cut, e.g. sawn into slabs of desired length measurements. Referring to the plant machinery illustrated in FIG. 1, in the manufacture of a continuous cellulose fiber web, cellulose fibers (fluff) are fed into a cyclone 1, through an infeed opening 2, and are then introduced into a mixer 3, where the fibers are mixed with air. The fiber/air mixture is passed from the mixer 3 to a portioning or metering unit 4, which dispenses said mixture in given quantities per unit of time, with the aid of a feed screw not shown. The metered quantities of fiber mass are drawn by suction into a conduit 6 connected to the inlet side of a fan 5, and are transported in the form of a suspension through a further conduit 7 to an elongated, tapering accelerating nozzle 8, from where the mass or suspension enters a forming chamber 9. During the passage along the tapering accelerating nozzle 8, the individual fibers in the suspension are imparted kinetic energy of such high value that when exiting from the nozzle 8, the fibers will enter the forming chamber 9 in an essentially rectilinear movement path. The top and bottom surfaces of the forming chamber 9 are defined by two substantially mutually parallel air permeable, endless belts 10 and 11. The belts 10 and 11 extend over rollers 12, 13, 14, 15, 16 and 17, of which at least the rollers 13 and 16 are driven, for instance by the motor 18 which drives the belt 10. The belts 10 and 11 are driven at mutually the same speed, in the direction of the arrows shown. The forming chamber 9, defined at top and bottom by the two belts 10 and 11, is defined in its vertical extension by air impermeable walls, of which the rear wall 19 is marked in FIG. 2. The forming chamber 9 will thus have a width which corresponds to the width of the air permeable belts 10 and 11 and a vertical extension, or height, which corresponds to the vertical spacing of the mutually opposing parts of belts 10 and 11. The outlet 21 from the forming chamber 9 (see FIG. 2) is completely open to the exit orifice 8' of the nozzle 8, which exit orifice will preferably have a width which corresponds to or is slightly smaller than the width of the forming chamber 9, whereas the outlet 21, on the other hand, can be closed by means of a closing roller 35, which is preferably made of lightweight material, for instance foamed plastics. The roller 35 can be raised so as to expose the outlet opening 21, described herebelow. For the purpose of guiding the fiber suspension exiting from the nozzle orifice 8', a blow chamber 28 is provided upstream of and in connection with the forming chamber inlet 20. The blow chamber 28 may be configured to form together with the blow nozzle 8 an injector, such that ambient air will be drawn into the gap between the impervious outer walls defining the exit orifice of the funnel-shaped nozzle and the two rollers 12 and 17, therewith engendering an overpressure in the blow container. The forming chamber 9 has arranged along the entire length thereof suction boxes 22 and 23 which generate an underpressure in the forming chamber 9. The two suction boxes 22 and 23 are connected to a suction fan 27 or some other suitable suction source, via the opening 24, 25 and a conduit 26. The plant machinery illustrated in FIG. 1 includes an adhesive container 29, provided with a pump (not shown), for feeding a highly liquid, polymeric silicate binder through a pipe 30 to a spray mozzle 31, which is intended to form in the blow container an adhesive mist which settles on the fibers moving therethrough. The formed slab or web 32 is moved out of the forming chamber 9 by the belts 10 and 11, and is transferred onto a conveyor, for instance a roller conveyor. One such roller conveyor is indicated by a roller 34. Depending on whether the slab 32 shall be subjected to heat treatment, pressing, cutting or some other working process, the slab is transported to a drying chamber, a press means or a cutter. When the slab discharged from the forming chamber already has the means or a cutter. When the slab discharged from the forming chamber already has the intended length, which can be achieved by intermittent feeding of fibers to the mixer 3, each slab thus produced may be used immediately, provided that a quick-drying adhesive is used and provided that it is not necessary to trim the end surfaces of the slab. In the case of the illustrated, exemplifying embodiment the slabs produced are provided on the outer surface with, for instance, a layer of tissue having a surface weight, or grammage, of 18 g/m$^3$ or therebelow, or a non-proven fabric, this material being drawn in lengths from two storage reels 33 and 33' and applied to the mutually facing surfaces of the air permeable belts 10 and 11. The provision of such layers is not absolutely necessary, however, and when a quick-drying adhesive is used, e.g. a silicate adhesive, the fibers may be allowed to come into direct contact with the two belts 10, 11, since any adhesive which might settle on the belts 10, 11 will dry and be removed from the belt surfaces during passage of the belts over the rollers 12, 13, 14 and 15, 16, 17.

Figure 2:
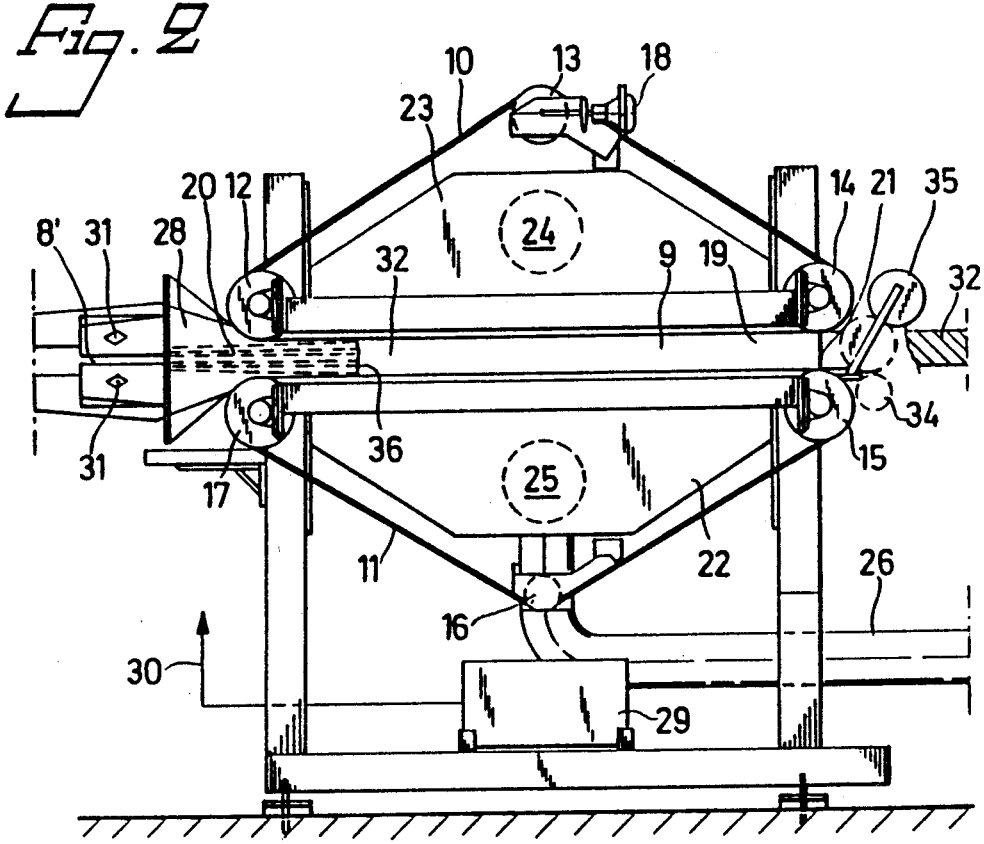
FIG. 2 illustrates in larger scale a slab forming chamber and a blower section co-acting therewith.
Figure 3:
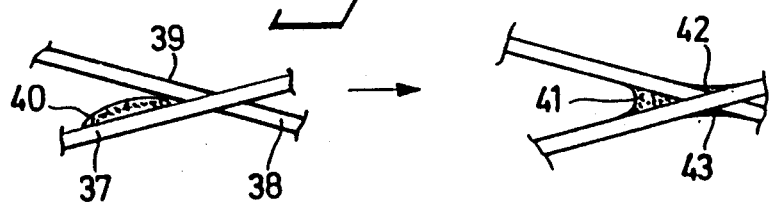
FIG. 3 illustrates the capillary effect utilized in forming the stable, open structure or fiber matrix.

The modus operandi of the illustrated plant machinery will now be described with reference to FIGS. 2 and 3. The fibers used in the illustrated embodiment are cellulose fibers and it is assumed that the slab produced will be ready for use upon manufacture and that the slab will be flame-proof, in addition to effectively dampening sound. In order to be able to produce a ready-for-use slab, e.g. a slab which requires no heat treatment, it is necessary to use an adhesive which will dry rapidly at room temperature, while the desired sound damping properties of the slab require the cellulose fibers to be practically free from impregnation and to retain their mobility. A flame-proof slab can be obtained by using, for instance, a prepolymerized alkali silicate of the type sold commercially under the trade name Bindzil FK10. This binder is diluted with up to 100 percent by weight water. A binder which will dry quickly at room temperature and which is completely dry when the slab leaves the forming chamber 9 is a requirement in achieving a sound dampening ability which exceeds the sound dampening ability of a conventional glass fiber slab or mineral wool slab of the same density, meaning that the adhesive shall not be allowed to penetrate into the cavities of the cellulose fibers and render the fibers rigid subsequent to drying of the adhesive.

As described in the aforegoing, the fibers leave the outlet orifices 8' of the accelerator nozzle and the velocity of the exiting air stream and the kinetic energy of each individual fiber is such that the fibers will move rectilinearly, or at least substantially rectilinearly, into and out of the blow chamber 28. A mist of highly liquid and quick-drying silicate adhesive is generated in the blow chamber, by means of the nozzles 31, which may be directed transversely to or in the direction of the fiber flow. A thin layer of adhesive will be applied to at least the major part of the fibers in the fiber flow, and the fibers will flow rapidly into the forming chamber, up to the location of the stop roller 35, against which a fiber slab wall 36 is build-up. This fiber slab wall 36 is moved rapidly against the fiber flow, and the belts 10 and 11 are set into motion when the fiber slab wall 36 is located, for instance, in the position shown in FIG. 2, the speed of said belts 10 and 11 being adjustable. As the slab formed between the fiber plate wall 36 and the stop roller is moved to the right in FIG. 2 when starting up the belts 10, 11, the roller 35 will be displaced obliquely upwards/forwards to the position shown in full lines, therewith exposing the outlet 21 of the forming chamber 9. The speed of the belts 10 and 11 is adjusted to correspond to the amount of fiber material supplied and the increased density of the slab, meaning that the fiber slab wall 36 will be substantially stationary. The adhesive-moistened fibers move in the direction of the longitudinal axis of the forming chamber 9 and are essentially uniformly distributed by the nozzle 8 over the upstanding wall or end surface of the plate 32 extending perpendicularly to the movement direction of the fibers. The two suction boxes 23 and 24 have the essential purpose of removing from the rearward part of the forming chamber 9, as seen in the direction of movement, air which has been injected into the chamber and against the wall 36, thereby to prevent the occurrence of a turbulent state, which would otherwise prevent the fibers from passing essentially at right angles to the wall or the end surface 36 and, instead, pass onto the belts 10 and 11 or, in the present case, onto the air permeable tissue webs. In the case of the illustrated embodiment, a suction effect also prevails behind the end surface 36, which contributes in withdrawing by suction a large amount of the thin-bodied silicate layer on the coated fibers. This removal by suction of the adhesive results in impregnation of the tissue webs such as to provide a practically fire-proof slab, when using a silicate adhesive of the aforesaid kind, while the fibers located inwardly of the silicate-drenched tissue layers will obtain the desired sound damping properties and remain flame-proof or essentially flame-proof. FIG. 3 is a simplified view of two fibers 37, 38, which have been "displaced" against the end surface 36. The fiber 38 has been coated over the whole of its surface with a layer 39 of highly liquid, thin-bodied silicate adhesive, whereas adhesive 40 has been applied to a smaller surface area of the fiber 37. It is well known that two mutually intersecting fibers will be bound together by capillary forces, owing to the absorption of the adhesive at the point of intersection, as illustrated to the right in FIG. 3, therewith forming bonding droplets 41, 42, 43, whereas the remaining parts of the fiber will at most be coated with a very thin adhesive layer. Thus, the fibers present in the finished slab will be bonded to one another in a such as to form a matrix in which the fibers cannot be displaced and which, in turn, will mean that when the slab is mounted vertically, for instance, the density of the slab will not change in the manner of a conventional, mineral-wool slab or a glass-wool slab, i.e. the fibers in the slab will not "avalanche" in a manner to result in a region of high density within the lower part of the slab and a region of lower density within the upper part of said slab. A slab produced in the aforedescribed manner, i.e. with mutually bonded fiber intersection points, and only a very thin coating on the fiber surfaces located externally of the intersection points, will have, in addition to flame resistance, an acoustic damping property which is higher than the acoustic damping property of, for instance, a mineral-wool slab of the same density and thickness. This improved sound absorption is due to the fact that the cellulose fiber cavities do not absorb the quickly-drying adhesive and thus retain their elasticity and, since the adhesive layer which at least substantially covers the fibers, does not alter to any appreciable extent the mobility of each individual fiber between its fixed intersection points, the acoustic energy will be readily converted to kinetic energy and therewith engender oscillations in the fibers in the three-dimensional matrix consisting of fibers which are mutually bonded in a punctiform fashion. The density of a slab produced in accordance with the invention may be caused to vary in different ways, for example by changing the amount of fiber present in the fiber suspension and by modifying the kinetic energy of each separate fiber.

Figure 4:
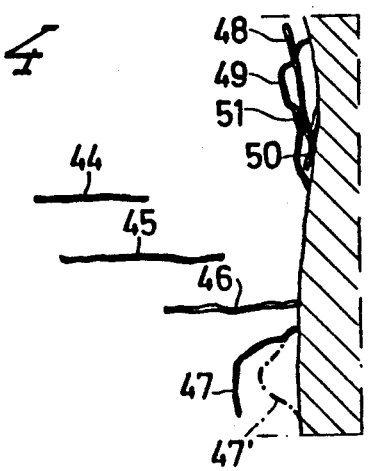
FIG. 4 is a simplified illustration of the construction of the fiber matrix.

FIG. 4, is a simplified illustration which shows how fibers are successively supplied to the formed end wall or end surface 36 of the slab. As beforementioned, the individual fibers are moved axially towards the end surface 36. FIG. 4 illustrates three fibers 44, 45 and 46 moving towards said end surface. The leading end of the fiber 46 has reached the end surface 36 and, because the part of the slab that has already formed is slightly porous, is able to penetrate some short distance into an open pocket in the fiber wall. It is assumed, however, that the end surface, 36 will function in the manner of a continuous abutment surface and that when the leading end of, for instance, the fiber 46 reaches the abutment surface, the fiber is stopped by the end surface 36 and will begin to bend towards said end surface 36, as illustrated by the fiber 47, to form an arc 47' for example. As indicated by the fibers 48, 49 and 50, there is thus formed a fibre network or matrix, of which the illustrated fibers 48 and 49 have been adhesively bonded together at their mutual intersection point 51.

The number of bonding points 51 will be contingent on the amount of adhesive supplied, on the amount of adhesive that is removed by suction, and on density, and has been found to lie between 5 and 40 for each 100 fibers present at a relatively low adhesive addition, for instance 1-20 percent by weight, calculated on slab density, which was from 30 to 70 kg/m$^3$.

I claim:

1. A sound absorbing and heat insulating fiber slab comprising cellulose fibers bonded together by means of an inorganic, flame-proof binder, characterized in that the binder belongs to the group of polymeric silicate binders which dry at room temperatures, said binder being homogeneously distributed in the slab and binding mutually adjacent fibers in a punctiform fashion to form a coherent matrix; in that the individual fibers are not impregnated with but are only thinly coated with binder and retain a high degree of mobility in the formed slab between their fixed intersection points; wherein the matrix exhibits from 5 to 40 bonding points calculated on each 100 fibers present; in that the slab has a density of 30-70 kg/m; and in that the binder is present in an amount of 1-20% by weight.

2. A fiber slab according to claim 1, characterized in that the binder is a prepolymerized alkali silicate.

* * * * *